(No Model.)

E. T. STARR.
DENTAL IMPRESSION CUP.

No. 347,976. Patented Aug. 24, 1886.

WITNESSES:
X. Lancaster
Edw. F. Simpson, Jr.

INVENTOR:
Eli T. Starr,
by his atty Wm. A. Peyton

UNITED STATES PATENT OFFICE.

ELI T. STARR, OF PHILADELPHIA, PENNSYLVANIA, ASSIGNOR TO THE S. S. WHITE DENTAL MANUFACTURING COMPANY, OF SAME PLACE.

DENTAL IMPRESSION-CUP.

SPECIFICATION forming part of Letters Patent No. 347,976, dated August 24, 1886.

Application filed July 7, 1886. Serial No. 207,315. (No model.)

*To all whom it may concern:*

Be it known that I, ELI T. STARR, a citizen of the United States, residing at Philadelphia, in the county of Philadelphia and State of Pennsylvania, have invented certain new and useful Improvements in Dental Impression-Cups; and I do hereby declare the following to be a full, clear, and exact description of the invention, such as will enable others skilled in the art to which it appertains to make and use the same.

My invention relates to impression-cups for the use of dentists in taking impressions of the mouth. Heretofore these cups have generally been made rigid, and various sizes, of the same general form, were required to suit different mouths.

An adjustable impression-cup made up of several pieces was suggested in McDonald's Patent No. 95,126, of September 21, 1869; but so far as I am aware that device has never been introduced into use, probably on account of its complexity and cost.

The object of my invention is to make a cheap and simple adjustable impression-cup, which may be adjusted to suit different-sized mouths; and it consists of an impression-cup made in one piece, with adjustable sides to vary the size or shape of the cup.

Figure 1:
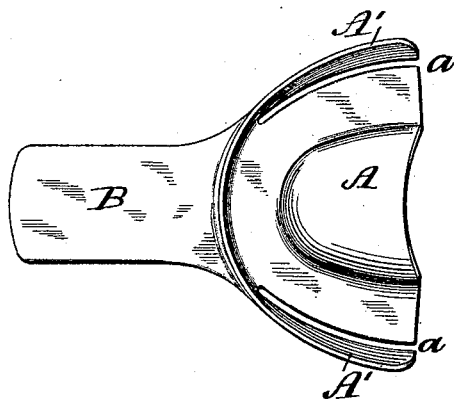
Figure 5:
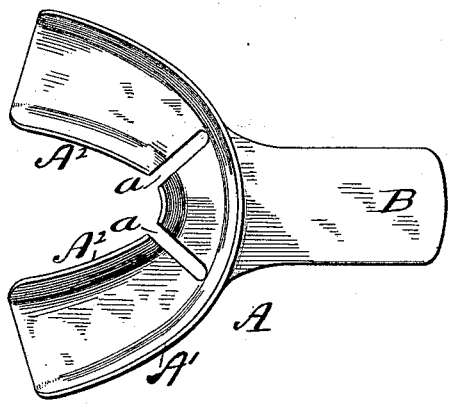
Figure 2:
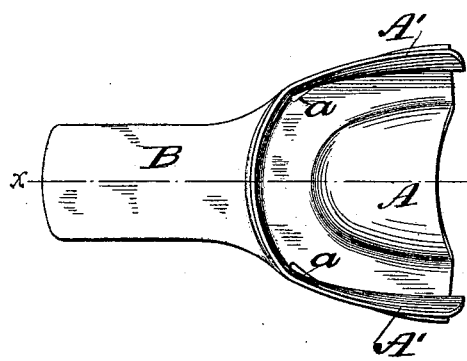
Figure 6:
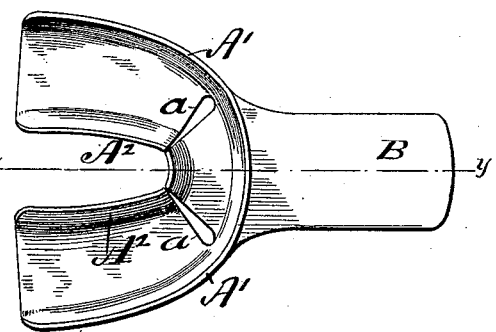
Figure 3:
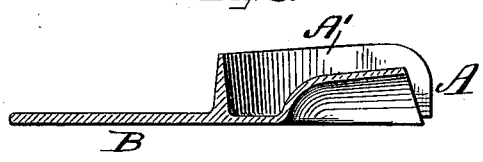
Figure 7:
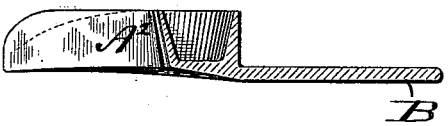
Figure 4:
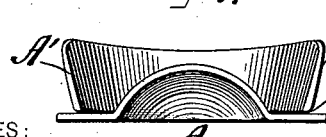
Figure 8:
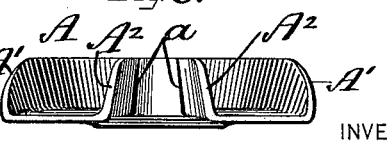

In the accompanying drawings, wherein I have illustrated two forms of embodying my invention, Figure 1 is a plan view of the improved impression-cup organized more especially with the view of taking impressions of the upper or superior jaw. Fig. 2 is a similar view of such a cup with the side walls adjusted to make a narrower cup. Fig. 3 is a section through Fig. 2 on the line $x\ x$ thereof, and Fig. 4 is an end view of the cup with its sides adjusted to make a narrow cup. Fig. 5 is a plan view of the improved impression-cup organized more especially with the view of taking impressions of the lower or inferior jaw. Fig. 6 is a similar view of such a cup with the sides adjusted to make a narrower cup. Fig. 7 is a section through Fig. 6 on the line $y\ y$ thereof, and Fig. 8 is an end view of the cup with its sides adjusted to make a narrow cup.

Instead of a rigid unyielding cup of a single piece of metal, as heretofore, my improved cup A may be made of the usual Brittania or other metal with slots $a$ in its bottom or sides, by which the cup may be readily bent or adjusted by the fingers to conform it in size or shape to suit the particular jaw of which an impression is to be taken.

In Figs. 1 to 4, inclusive, I have shown an impression-cup more particularly intended for the upper or superior jaw. The cup A has the usual shape, and is provided with the usual handle, B. The side walls, in that example, may be slotted just above the bottom of the cup, and the slots run back from the inner end of the cup to near the outer or rear end wall thereof, whereby the side walls, A' A', of the cup may be readily bent to make a wide or narrow cup, as is obvious, and to suit the particular shape of the alvealar ridge of which an impression is to be taken.

In Figs. 5 to 8, inclusive, I have shown an impression-cup more particularly intended for the lower or inferior jaw. The cup A has the usual shape and the usual handle, B. In this example the bottom and inner walls of the cup may be slotted, and the slots run from and through the inner walls, $A^2\ A^2$, and bottom of the cup to a point near the outer walls, A' A', as clearly shown, whereby the sides of the cup may be readily bent or adjusted to make the cup a wide or narrow one and to suit the particular case in hand.

Further explanation or the illustration of other forms of my improved adjustable impression-cup seems to be unnecessary, the forms already described and shown being the best now known to me of embodying my invention for the upper and lower jaws.

I claim as my invention—

A dental impression-cup the body or mouth portion of which is made of a single piece of metal slotted so as to render its side or sides adjustable by bending, substantially as described.

In testimony whereof I affix my signature in presence of two witnesses.

ELI T. STARR.

Witnesses:
ROBT. E. GORDON,
H. R. BARBER.